(12) United States Patent
Bentschneider

(10) Patent No.: US 9,102,017 B2
(45) Date of Patent: Aug. 11, 2015

(54) MODULAR ASSEMBLY TABLE FOR SUPPORTING INDUSTRIAL FIXTURES AND TOOLING

(75) Inventor: Stephen E. Bentschneider, Jackson, MI (US)

(73) Assignee: LABOR AIDING SYSTEMS, INC., Jackson, MI (US)

( * ) Notice: Subject to any disclaimer, the term of this patent is extended or adjusted under 35 U.S.C. 154(b) by 337 days.

(21) Appl. No.: 13/555,771

(22) Filed: Jul. 23, 2012

(65) Prior Publication Data

US 2013/0187321 A1   Jul. 25, 2013

Related U.S. Application Data

(60) Provisional application No. 61/510,542, filed on Jul. 22, 2011.

(51) Int. Cl.
*B23Q 3/18* (2006.01)
*B23P 19/04* (2006.01)
*B23P 21/00* (2006.01)

(52) U.S. Cl.
CPC   *B23P 19/04* (2013.01); *B23P 21/00* (2013.01)

(58) Field of Classification Search
CPC ............ B23P 19/04; B23P 21/00; B66F 7/02; B66F 7/28; B66F 7/14; B65G 47/90; B23Q 1/25; B23Q 1/26; B23Q 1/262; B23Q 1/28; B23Q 1/282

USPC ..... 269/58, 56, 59, 60, 55; 254/2 C, 2 B, 3 B, 254/3 C; 248/132; 108/50.01, 50.02
See application file for complete search history.

(56) References Cited

U.S. PATENT DOCUMENTS

| | | |
|---|---|---|
| 3,939,544 A | 2/1976 | Stevens |
| 5,116,264 A | 5/1992 | Wiederrich et al. |
| 5,313,892 A | 5/1994 | Tice |
| 5,653,005 A | 8/1997 | Speller, Sr. et al. |
| 7,178,227 B2 | 2/2007 | Ghuman et al. |
| 2014/0097568 A1* | 4/2014 | Matsumoto ..................... 269/58 |

FOREIGN PATENT DOCUMENTS

JP          2000016778 A   *   1/2000

* cited by examiner

*Primary Examiner* — Lee D Wilson
*Assistant Examiner* — Jamal Daniel
(74) *Attorney, Agent, or Firm* — Young Basile Hanlon & MacFarlane P.C.

(57) ABSTRACT

A modular assembly table for supporting industrial fixtures and tooling for manufacturing and assembling various workpieces. The modular assembly table may provide a support structure having a base and an upright framing structure connected to the base. At least one guide rod is connected to and supported by the support structure. A fixture plate and an extension plate may be slidably connected to the at least one guide rod. A rigid connector is attached to the fixture plate and the extension plate for maintaining a predetermined distance between the fixture plate and the extension plate. At least one linear actuator may be connected to the support structure and the fixture plate for linearly adjusting the position of the fixture plate on the at least one guide rod.

20 Claims, 21 Drawing Sheets

MODULAR ASSEMBLY TABLE FOR SUPPORTING INDUSTRIAL FIXTURES AND TOOLING

CROSS-REFERENCE TO RELATED APPLICATIONS

This application claims priority to U.S. Provisional Patent Application Ser. No. 61/510,542, which was filed on Jul. 22, 2011.

FIELD OF THE INVENTION

The present invention relates to a modular assembly table, and in particular, a modular assembly table for releasably supporting a variety of industrial fixtures and tooling for manufacturing and assembling various workpieces.

BACKGROUND OF THE INVENTION

Due to the development of an international marketplace, the manufacturing industry has become extremely competitive. One of the largest costs in the manufacturing industry, and one which has been on the rise for the past decade, has been the cost of fixtures and tooling for industrial machinery. The reason for the high cost is that the fixtures and tooling for the industrial machinery are typically customized for a specific operation and/or workpiece. In addition, various companies and/or manufacturing facilities may require different specifications for their industrial machinery, thereby requiring machine builders to further customize their machines.

The problem with customizing such industrial machinery is that the machinery must either be replaced or rebuilt if the manufacturing operation and/or the workpiece is changed. In addition, customization of the equipment may prevent the machinery from being transferred to another company or manufacturing facility due to the machinery not meeting the receiving company's or manufacturing facility's specifications. Even when the equipment can be rebuilt for a new operation, workpiece, or manufacturing facility, the rebuilding costs are often prohibitive since fixturing and tooling must typically be replaced. Thus, the rebuilding of the machinery to remove and replace the fixturing and/or tooling often dictates that the user simply purchase new equipment.

However, even when the fixturing and/or tooling can be replaced, the framework of the machine often prohibits the utilization of different fixturing and/or tooling, thereby prohibiting the machine from being used for different workpieces and different processes.

Thus, it would be desirable to provide an industrial piece of machinery that was modular in design so that the fixturing and/or tooling of the industrial machinery could easily be replaced with the same or different fixturing and/or tooling without the cost of having to rebuild and/or replace the surrounding equipment.

SUMMARY OF THE INVENTION

The present invention provides a modular assembly table for supporting industrial fixtures and tooling for manufacturing and assembling various workpieces. The modular assembly table of the present invention provides a support structure having a base and an upright framing structure connected to the base. At least one guide rod is connected to and is supported by the support structure. The fixture plate is slidably connected to the at least one guide rod, and an extension plate is also slidably connected to the at least one guide rod. A rigid connector is attached to the fixture plate and the extension plate for maintaining a predetermined distance between the fixture plate and the extension plate. At least one linear actuator is connected to the support structure and the fixture plate for linearly adjusting the position of the fixture plate along the at least one guide rod. At least one controller is connected to the upright framing structure for controlling the at least one linear actuator. At least one bushing is connected to the fixture plate and is slidably connected to the at least one guide rod for providing linear adjustment of the fixture plate along the at least one guide rod. At least one bushing is also connected to the extension plate and slidably connected to the at least one guide rod for providing linear adjustment of the extension plate along the at least one guide rod.

The base of the support structure may provide at least one substantially rectangular hollow, rigid member. The upright framing structure of the support structure may provide a pair of substantially parallel elongate support members connected to the base. A pair of substantially parallel crossbar members may be connected to and extend between the support members. A pair of substantially parallel diagonal support members are connected to and extend between the support members and the base.

At least one cantilevered support may be connected to and extend from the upright framing structure and have an aperture extending therethrough for receiving the at least one guide rod.

The connector may have a linear actuator having a cylinder and a piston rod extending from the cylinder, wherein the cylinder is connected to the fixture plate, and the piston rod is connected to the extension plate. The piston rod is linearly adjustable to adjust the distance between the fixture plate and the extension plate.

A slide rod may be connected to the extension plate and be slidably connectable to the tooling.

BRIEF DESCRIPTION OF THE DRAWINGS

The description herein makes reference to the accompanying drawings, wherein like-referenced numerals refer to like parts throughout several views, and wherein.

DESCRIPTION OF THE PREFERRED EMBODIMENT

Figure 1:
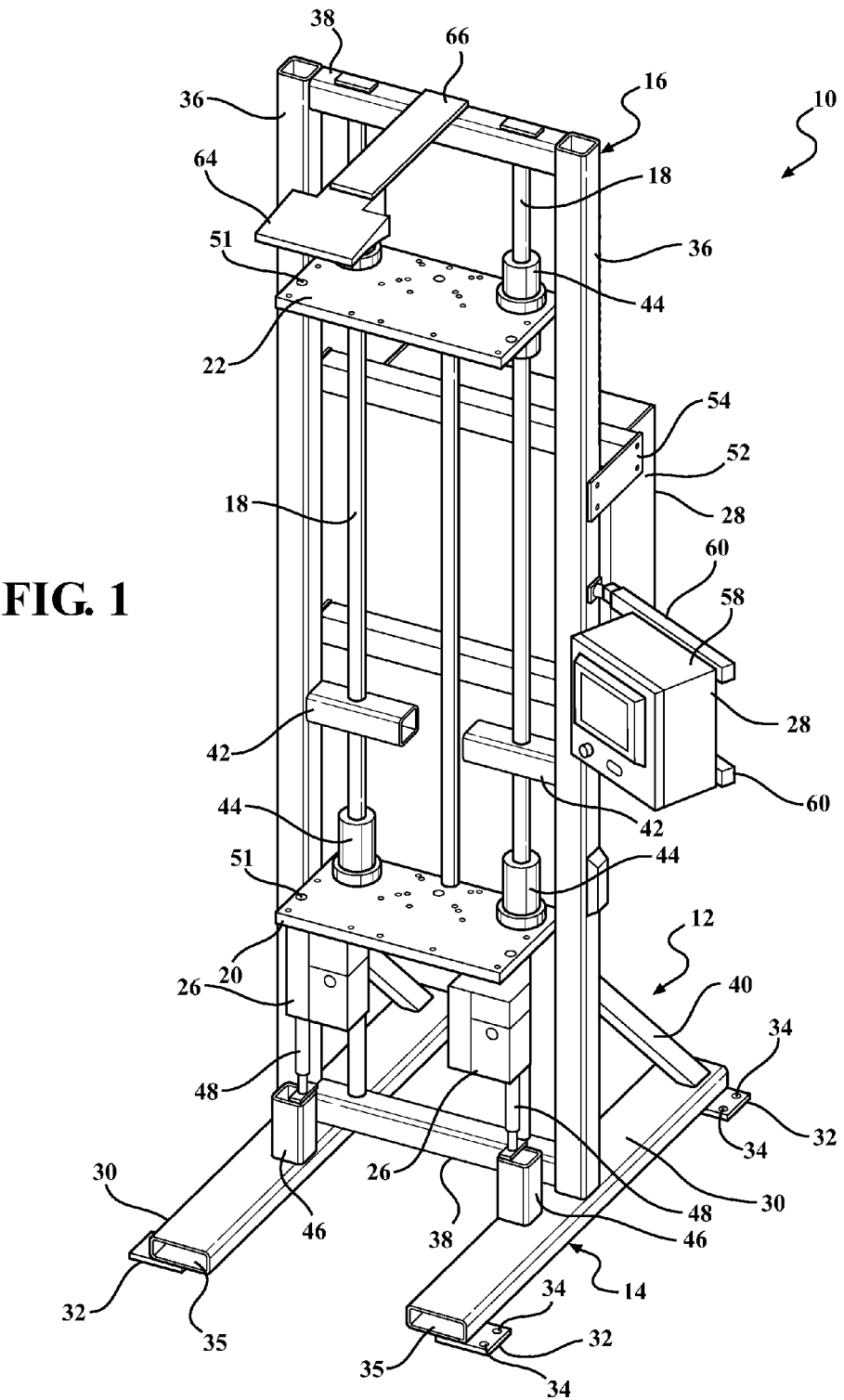
FIG. 1 is a perspective view of the modular assembly table of the present invention.

Referring to the drawings, the present invention will now be described in detail with reference to the disclosed embodiment.

As seen in FIGS. 1-21, a modular assembly table 10 of the present invention releasably supports various industrial fixtures 11 and industrial tooling 13 in order to manufacture and assemble various workpieces 15. The modular assembly table 10 provides a support structure 12 having a base 14 connected to an upright framing structure 16. The upright framing structure 16 of the support structure 12 supports a pair of guide rods 18 that extend the length of the upright framing structure 16. A fixture plate 20 is slidably connected to the pair of guide rods 18 and is connectable to the industrial fixtures 11 and tooling 13. An extension plate 22 is also slidably connected to the guide rods 18 and is connectable to the industrial tooling 13. A connector 24 is attached to the fixture plate 20 and the extension plate 22 to adjust and maintain the distance between the fixture plate 20 and the extension plate 22 along the guide rods 18. A pair of linear actuators 26 are provided to adjust the height or position of the fixture plate 20 along the guide rods 18. Various controllers 28 may be connected to the upright framing structure 16 of the support structure 12 to provide electronic and/or programmable control of the linear actuators 26 and the industrial fixtures 11 and tooling 13. A light fixture 64 may also be connected to the top of the upright framing structure 16 through the use of a mounting bracket 66 in order to provide a sufficient amount of light to an operator (not shown). The modular assembly table 10 of the present invention is unique in that it provides an efficient manner in which to attach and remove the various industrial fixtures 11 and industrial tooling 13 to and from the modular assembly table 10 for manufacturing and assembling the various workpieces 15.

Figure 2:
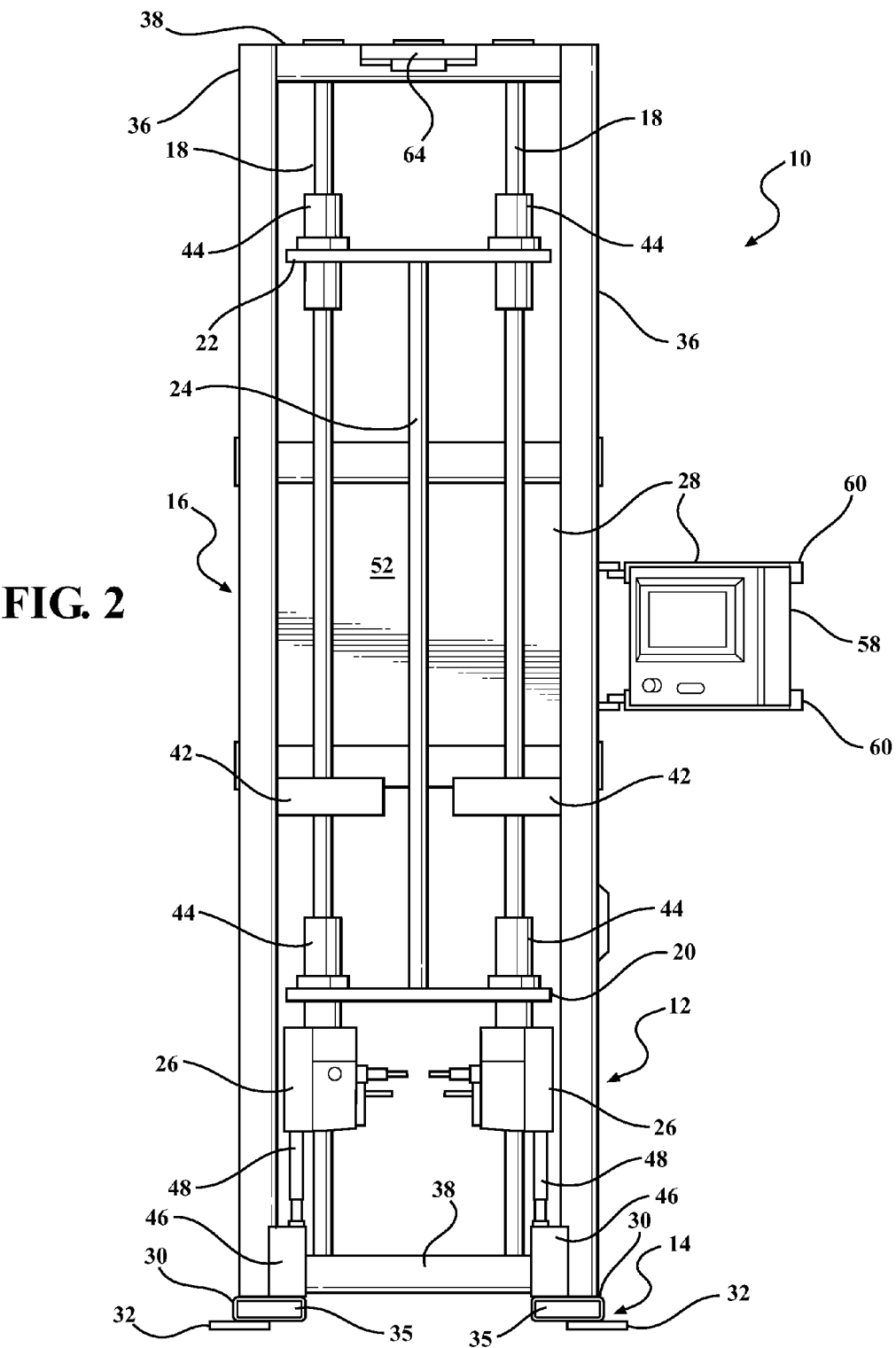
FIG. 2 is a front view of the modular assembly table of the present invention.
Figure 3:
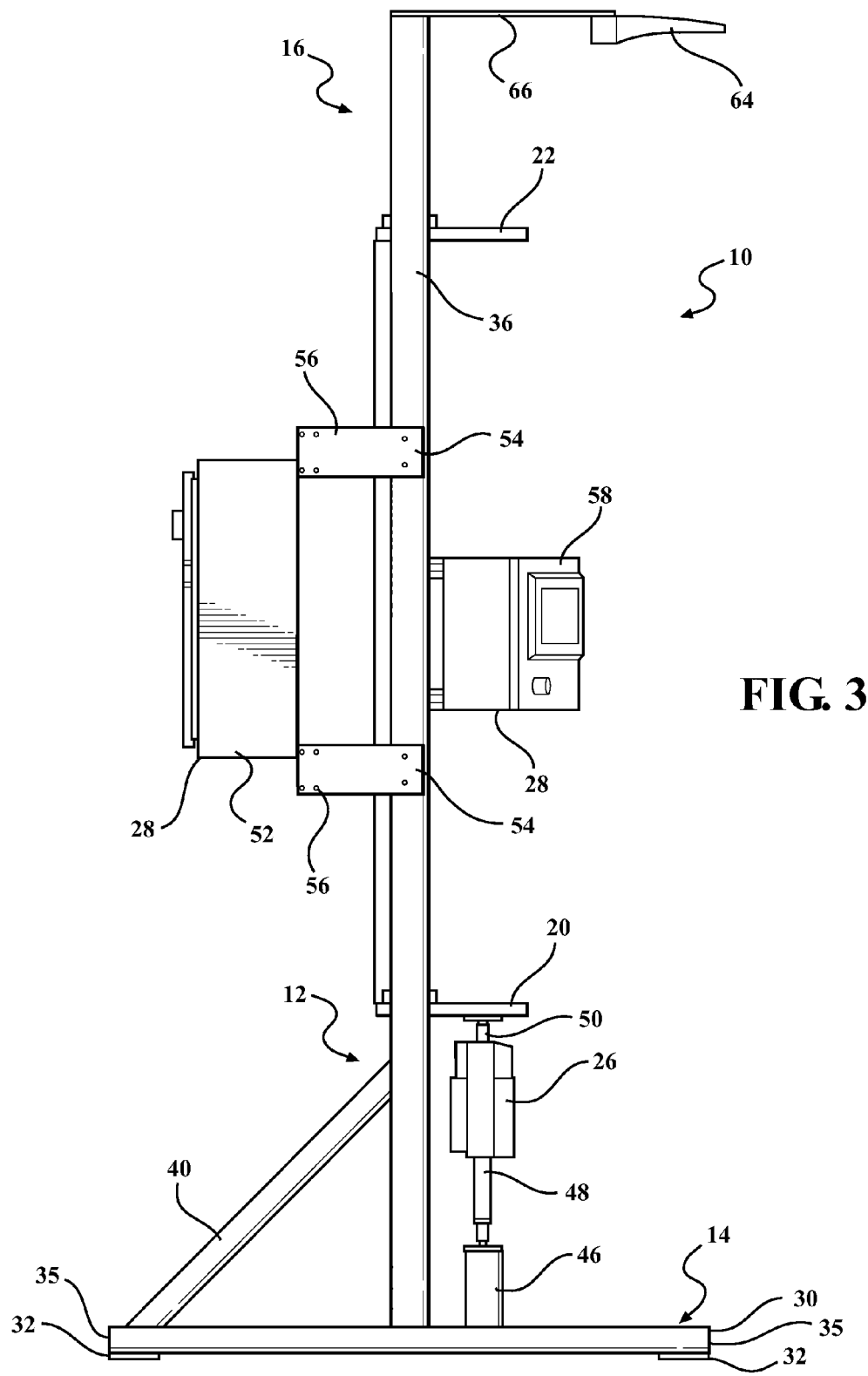
FIG. 3 is a right side view of the modular assembly table of the present invention.

In order to properly support the modular assembly table 10 of the present invention, the support structure 12 includes the base 14 connected to the upright framing structure 16, as seen in FIGS. 1-3. The base 14 is fabricated from a pair of substantially similar rectangular tubular members 30 that are aligned substantially parallel to one another and are fabricated from a high-strength material, such as steel. Each of the tubular members 30 of the base 14 has a mounting bracket 32 connected to the underside of each end of the tubular members 30. The mounting brackets 32 have a plate-like substantially rectangular configuration and are fabricated from a high-strength material, such as steel. Each mounting bracket 32 extends outward from the tubular members 30 and provides a pair of apertures 34 extending therethrough. The apertures 34 in the mounting brackets 32 receive conventional fasteners or anchors (not shown) which may be connected to a substructure (not shown), such as the floor of a manufacturing facility. The fasteners or anchors secure the modular assembly table 10 to the substructure. The tubular members 30 of the base 14 are open at their ends 35 so as to receive a pair of forks (not shown) of a forklift truck (not shown). This allows the modular assembly table 10 to be easily lifted and moved by a forklift truck to a proper location and position.

The upright framing structure 16 of the support structure 12 is connected to the tubular members 30 of the base 14 substantially midway along the length of the tubular members 30 of the base 14. The upright framing structure 16 provides a pair of elongated substantially square tubular members 36 that extend upward at a substantially right angle to the tubular members 30 of the base 14. The elongated tubular members 36 are supported by substantially rectangular cross-members 38 that are connected to each end of the elongated tubular members 36. Diagonal support members 40 are connected to the tubular members 30 of the base 14 and to the elongated tubular members 36 of the upright framing structure 16 at acute angles so as to support the elongated tubular members 36 in their upright position. The elongate tubular members 36, the cross-members 38, and the diagonal support members 40 are all fabricated from a high-strength material, such as steel.

To guide the movement of the fixture plate 20 and the extension plate 22 along the guide rods 18, the guide rods 18 are connected to and extend between the cross-members 38 of the upright framing structure 16 of the support structure 12. The guide rods 18 are further supported by a pair of substantially rectangular tubular cantilevered supports 42 that are connected to and extend inward from the elongated tubular members 36 of the upright framing structure 16. Each of the cantilevered supports 42 have an aperture extending therethrough for receiving the guide rods 18. The fixture plate 20 and the extension plate 22 each have bushings 44 that are connected thereto for receiving the guide rods 18. The bushings 44 promote the sliding of the fixture plate 20 and the extension plate 22 relative to the guide rods 18. The connector 24 has a substantially cylindrical, rigid tubular configuration that is connected to both the fixture plate 20 and the extension plate 22. The connector 24 allows the distance between the fixture plate 20 and the extension plate 22 to be maintained and adjusted along the guide rods 18. To provide linear adjustment of the fixture plate 20 and the extension plate 22 along the guide rods 18, the linear actuators 26 are mounted beneath the fixture plate 20. A pair of support stands 46 are connected to the tubular members 30 of the base 14 and extend upward toward the fixture plate 20. A mounting post 48 connects the linear actuator 26 to the support stand 46. The linear actuator 26 provides a linear actuator rod 50 that extends from the linear actuator 26 and is connected to the underside of the fixture plate 20. The linear actuator 26 provides reciprocal movement of the linear actuator rod 50 so as to provide linear adjustment of the fixture plate 20 and the extension plate 22 along the guide rods 18. Both the fixture plate 20 and the extension plate 22 may be fabricated from hardened steel and may have numerous apertures 51 formed therein for mounting the various industrial fixtures 11 and industrial tooling 13 thereto.

In order to provide power and programmable controls to the modular assembly table 10, an electrical panel 52 may be connected to the elongated tubular members 36 of the upright framing structure 16 by four mounting brackets 54. The mounting brackets 54 are connected to the electrical panel 52 and to the elongated tubular members 36 of the upright framing structure 16 by conventional fasteners 56. The electrical panel 52 may provide an electrical disconnect and connection to the modular assembly table 10 as well as any programmable controls that may be required of the modular assembly table 10. The modular assembly table 10 may also provide a touch-screen programmable controller 58 that is connected to the elongated tubular members 36 of the upright framing structure 16 by a pair of mounting brackets 60. The mounting brackets 60 are connected to the elongated tubular member 36 of the upright framing structure 16 by conventional fasteners. The programmable controller 58 may store numerous computer programs that correspond to various workpieces 15 so as to provide predetermined heights of the fixture plate 20 and the extension plate 22 for each particular workpiece 15. This allows the modular assembly table 10 to provide the proper height of the fixture plate 20 and the extension plate 22 upon the operator selecting the appropriate workpiece 15 on the programmable controller 58.

Figure 4:
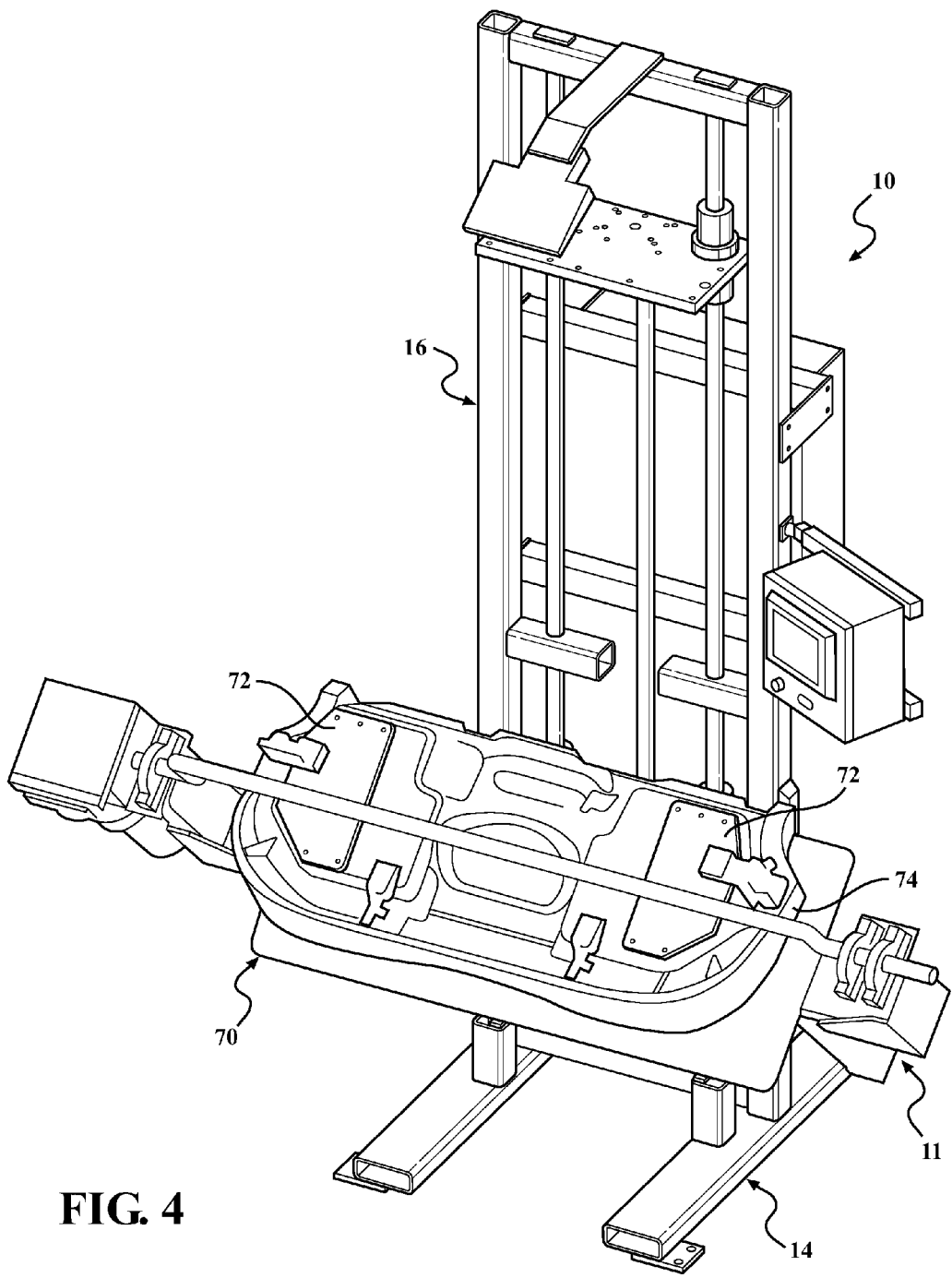
FIG. 4 is a perspective view of the modular assembly table of the present invention being used in combination with an assembly compression fixture for an automobile seat.
Figure 5:
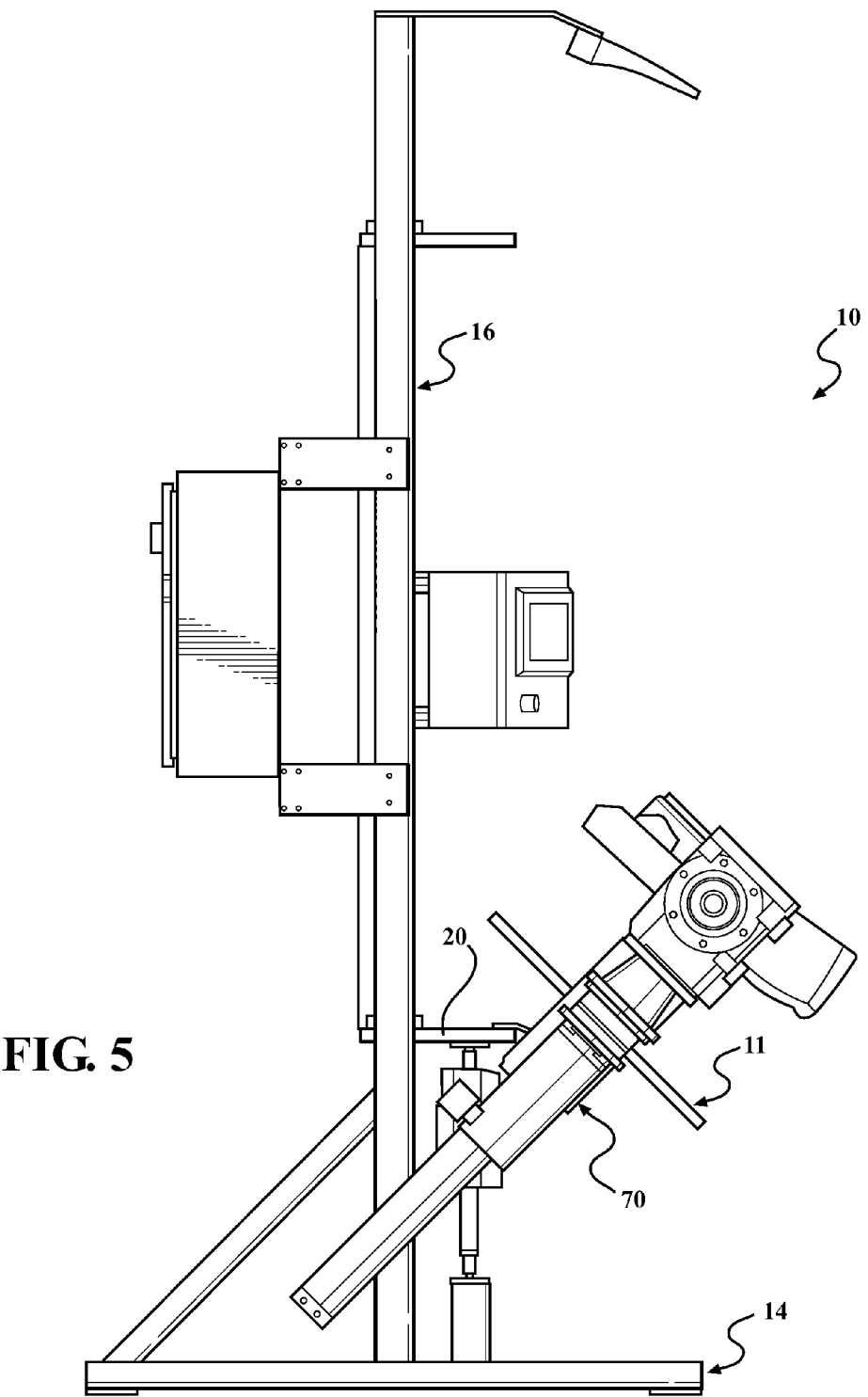
FIG. 5 is a side view of the modular assembly table of the present invention being used in combination with an assembly compression fixture for an automobile seat.

The advantage to the modular assembly table 10 of the present invention is the ease in which the various industrial fixtures 11 and industrial tooling 13 may be connected to and disconnected from the modular assembly table 10, as shown in FIGS. 4-21. As seen in FIGS. 4-5, an assembly compression fixture 70 is connected to the fixture plate 20 through the use of conventional fasteners. The assembly compression fixture 70 provides a unique fixture that allows for heating elements 72 to be press-fit onto the underside of an automobile seat cushion 74.

Figure 6:
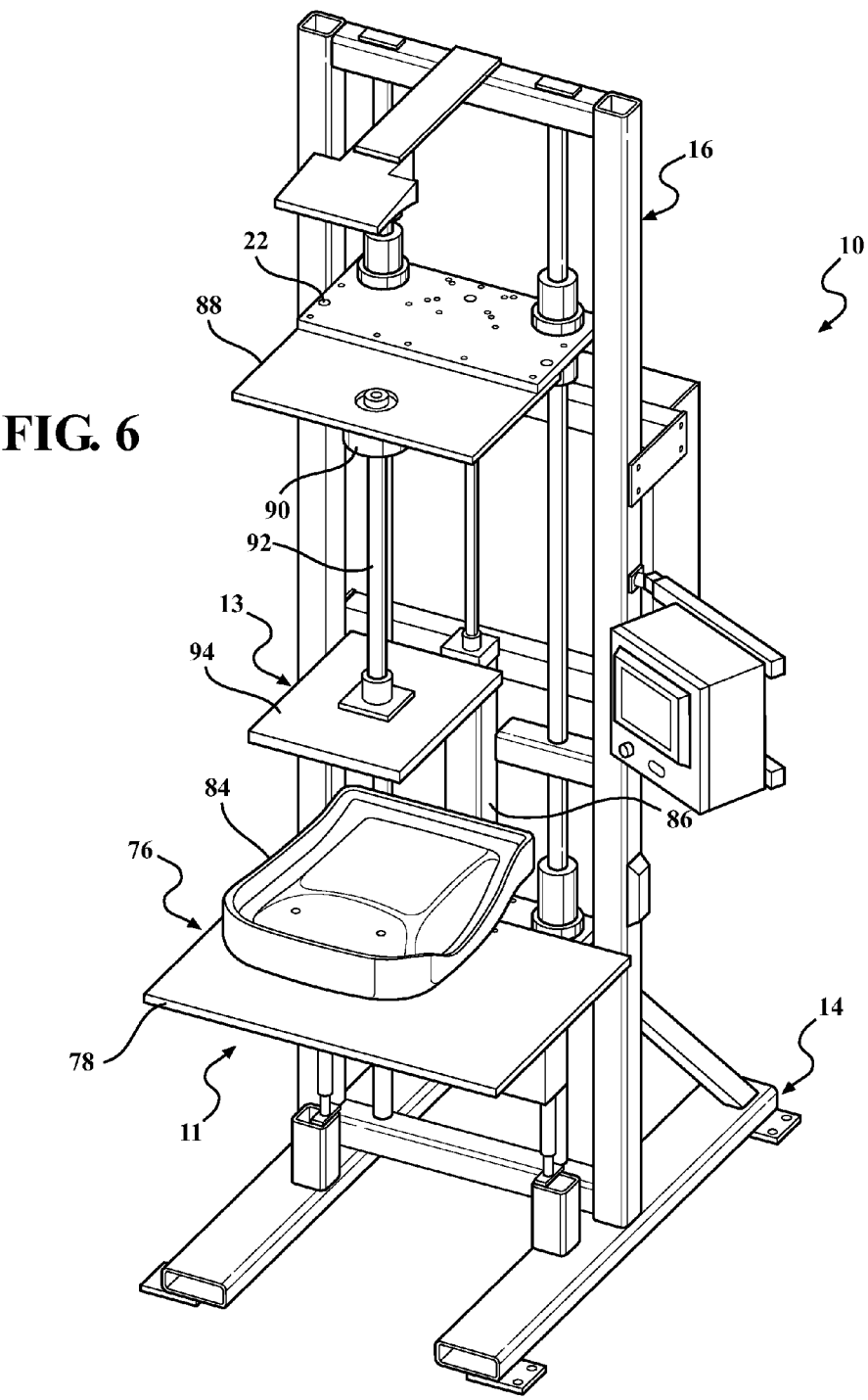
FIG. 6 is a perspective view of the modular assembly table of the present invention being used in combination with a compression fixture for an automobile seat.
Figure 7:
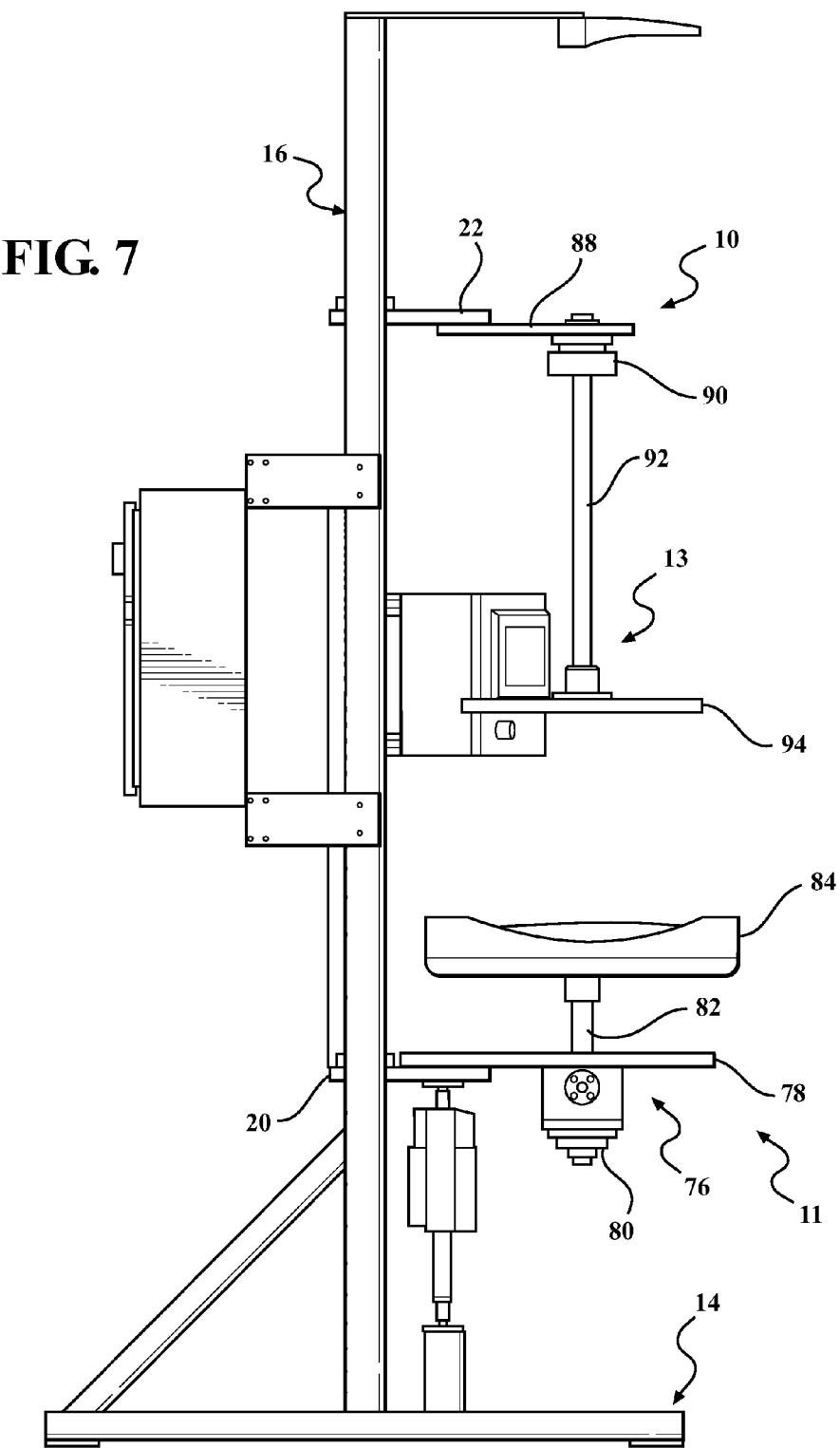
FIG. 7 is a side view of the modular assembly table of the present invention being used in combination with a compression fixture for an automobile seat.

In FIGS. 6-7, another embodiment of the modular assembly table 10 is used to support a compression fixture 76. The compression fixture 76 includes a mounting plate 78 that is connected to the fixture plate 20 through the use of conventional fasteners. A compression mount 80 is mounted to the underside of the mounting plate 78 and supports a rod 82 that is connected to an automobile seat cushion fixture 84 for positioning and holding a seat cushion (not shown). In this particular embodiment, the connector 24 is a hydraulic cylinder 86 connected to the fixture plate 20 and the extension plate 22 for adjusting and maintaining the spacing between the fixture plate 20 and the extension plate 22 along the guide rods 18. The extension plate 22 has a supplemental extension plate 88 connected thereto by conventional fasteners. The supplemental extension plate 88 has a compression mount 90 connected thereto for supporting a rod 92 which is connected to a compression plate 94. The hydraulic cylinder 86 allows the compression plate 94 to move downward and press a heating pad (not shown) onto the underside of the automobile seat cushion.

Figure 8:
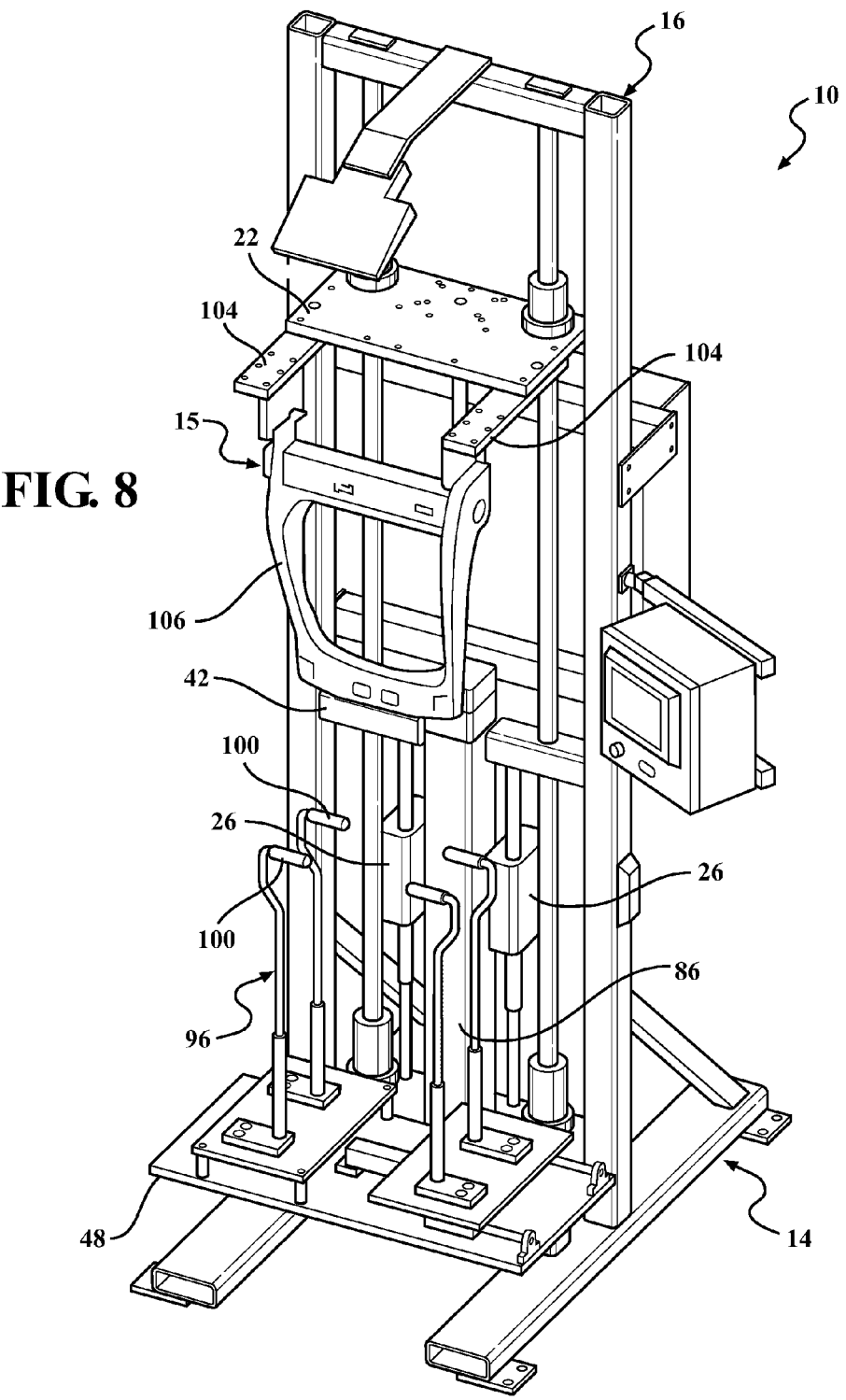
FIG. 8 is a perspective view of the modular assembly table of the present invention being used in combination with a roller stuffer for an automobile seat.
Figure 9:
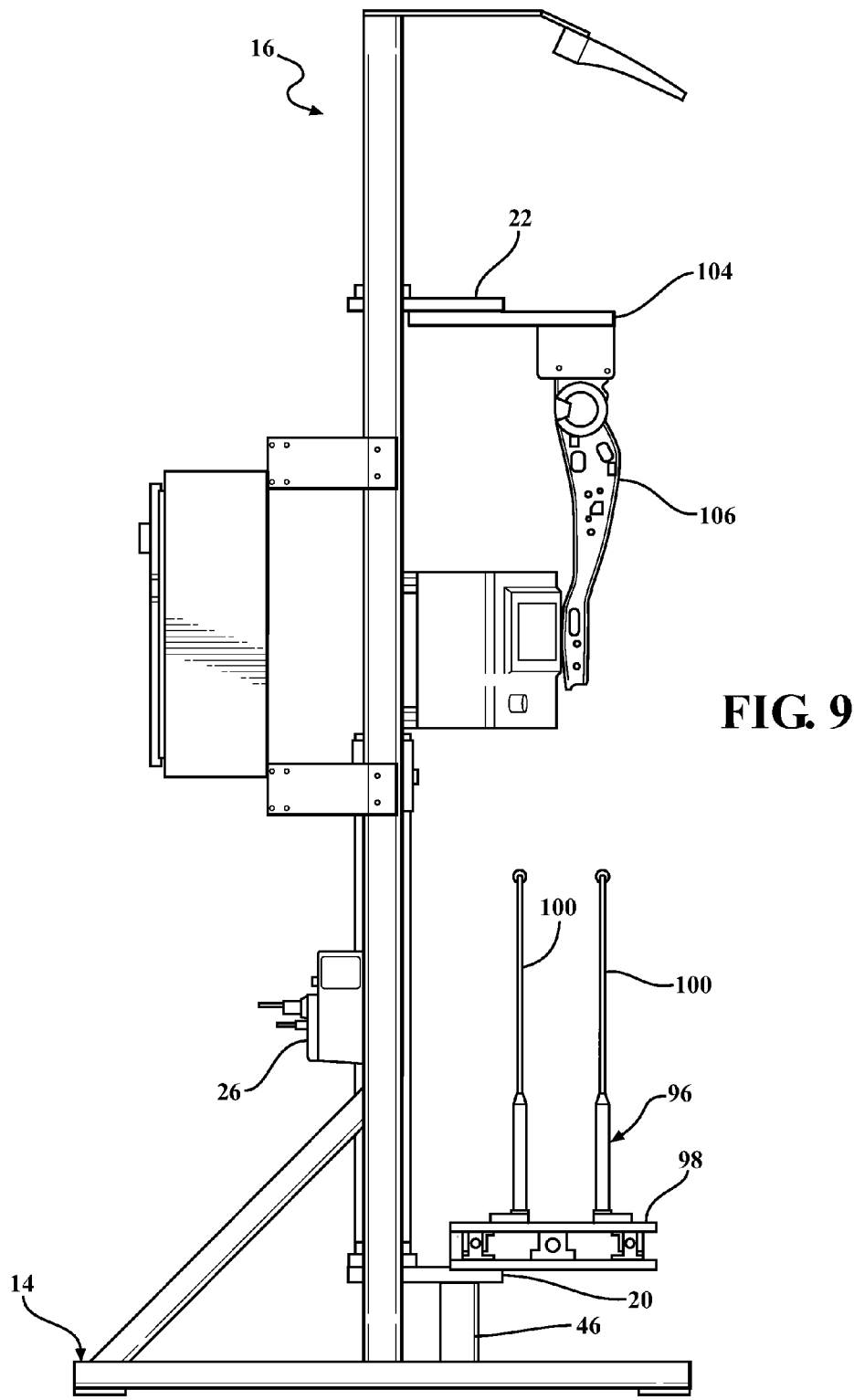
FIG. 9 is a side view of the modular assembly table of the present invention being used in combination with a roller stuffer for an automobile seat.

As seen in FIGS. 8-9, yet another embodiment of the modular assembly table 10 may be used in combination with a roller stuffer 96 for an automobile seat cushion. In this embodiment, the linear actuators 26 are connected to and positioned between the cantilevered supports 42 and the fixture plate 20. The fixture plate 20 is lowered and supported by the support stands 46. A mounting plate 98 having roller stanchions 100 connected thereto extend upward from the mounting plate 98. The mounting plate 98 is connected to the fixture plate 20 through the use of conventional fasteners. The hydraulic cylinder 86 is mounted to the extension plate 22 and the fixture plate 20, as described in the previous embodiment. A pair of fixture brackets 104 are connected to the extension plate 22 by conventional fasteners and are utilized to secure and hold the frame 106 of an automobile seat. A seat cushion (not shown) is placed on the frame 106 of the automobile seat, and an automobile seat cover (not shown) is placed inside-out over the roller stanchions 100. Upon the lowering of the frame 106 via the hydraulic cylinder 86, the automobile seat cover is rolled over the frame 106 and the seat cushion of the automobile seat by the roller stanchions 100, as the automobile seat is lowered into the seat cover.

Figure 10:
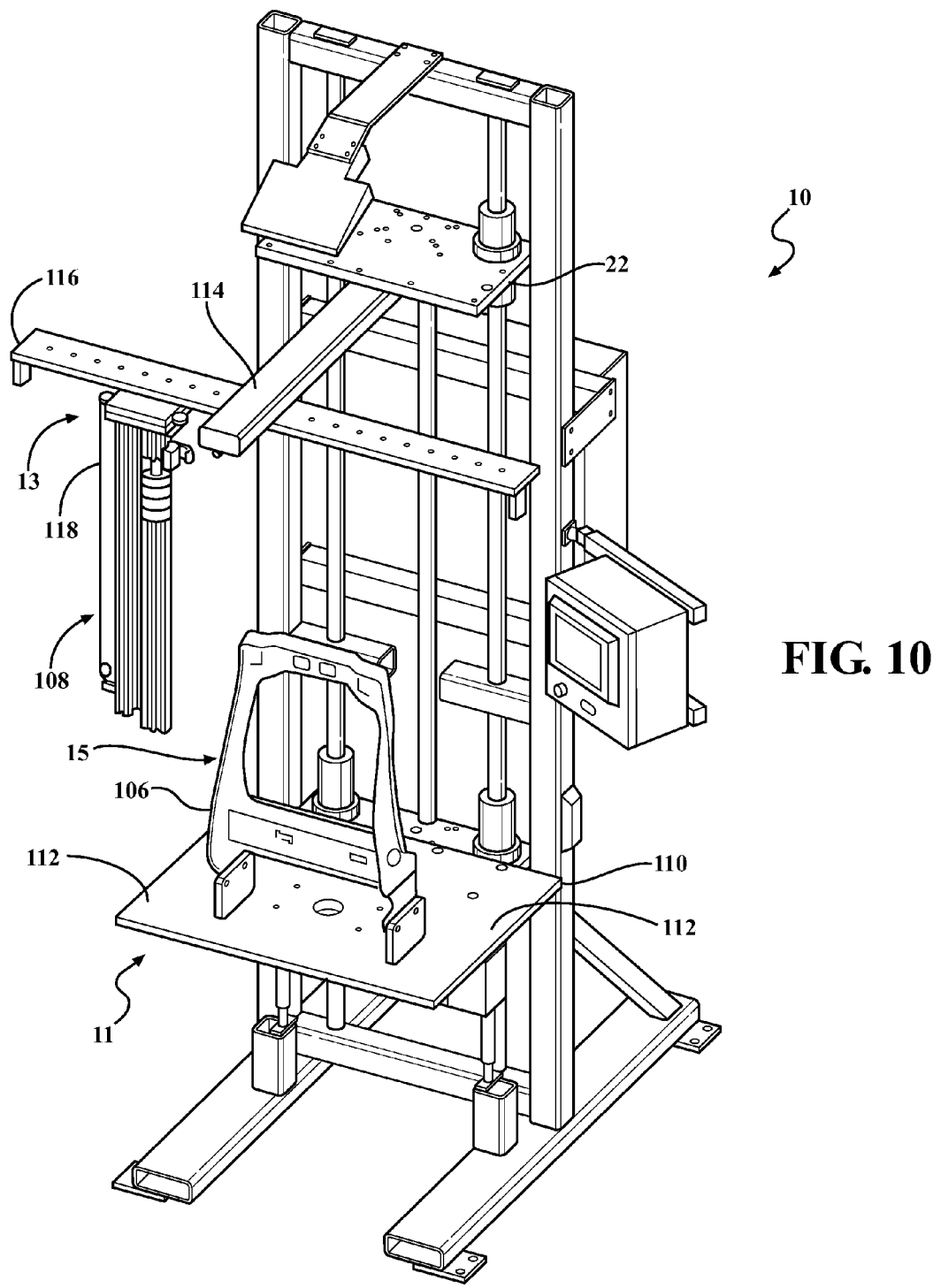
FIG. 10 is a perspective view of the modular assembly table of the present invention being used with a torque arm assembly.
Figure 11:
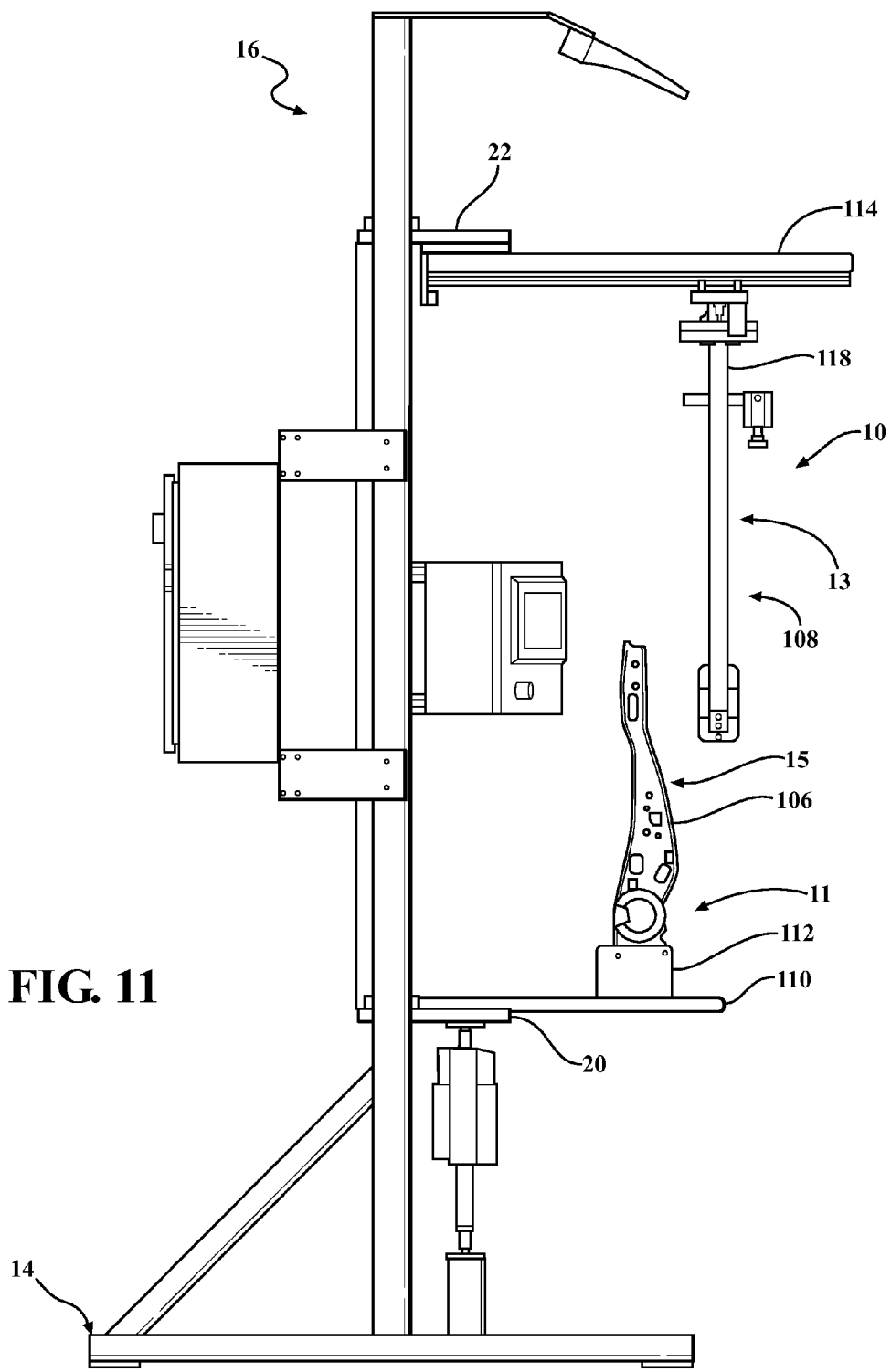
FIG. 11 is a side view of the modular assembly table of the present invention being used with a torque arm assembly.

As seen in FIGS. 10-11, the modular assembly table 10 of the first embodiment may be utilized in conjunction with a torque arm assembly 108. The torque arm assembly 108 utilizes a mounting plate 110 that is connected to the fixture plate 20 through the use of conventional fasteners. The mounting plate 110 is used to mount a fixture 112 for securing the frame 106 of an automobile seat. An extension arm 114 is connected to the extension plate 22 through the use of conventional fasteners. The extension arm 114 is connected to a slide rod 116, which slidably supports a powered torque arm 118. The powered torque arm 118 is utilized to apply specific amounts of torque when connecting fasteners to the automobile seat frame 106. A torque box (not shown) may be mounted to the modular assembly table 10 to monitor the angle and torque of the powered torque arm 118.

Figure 12:
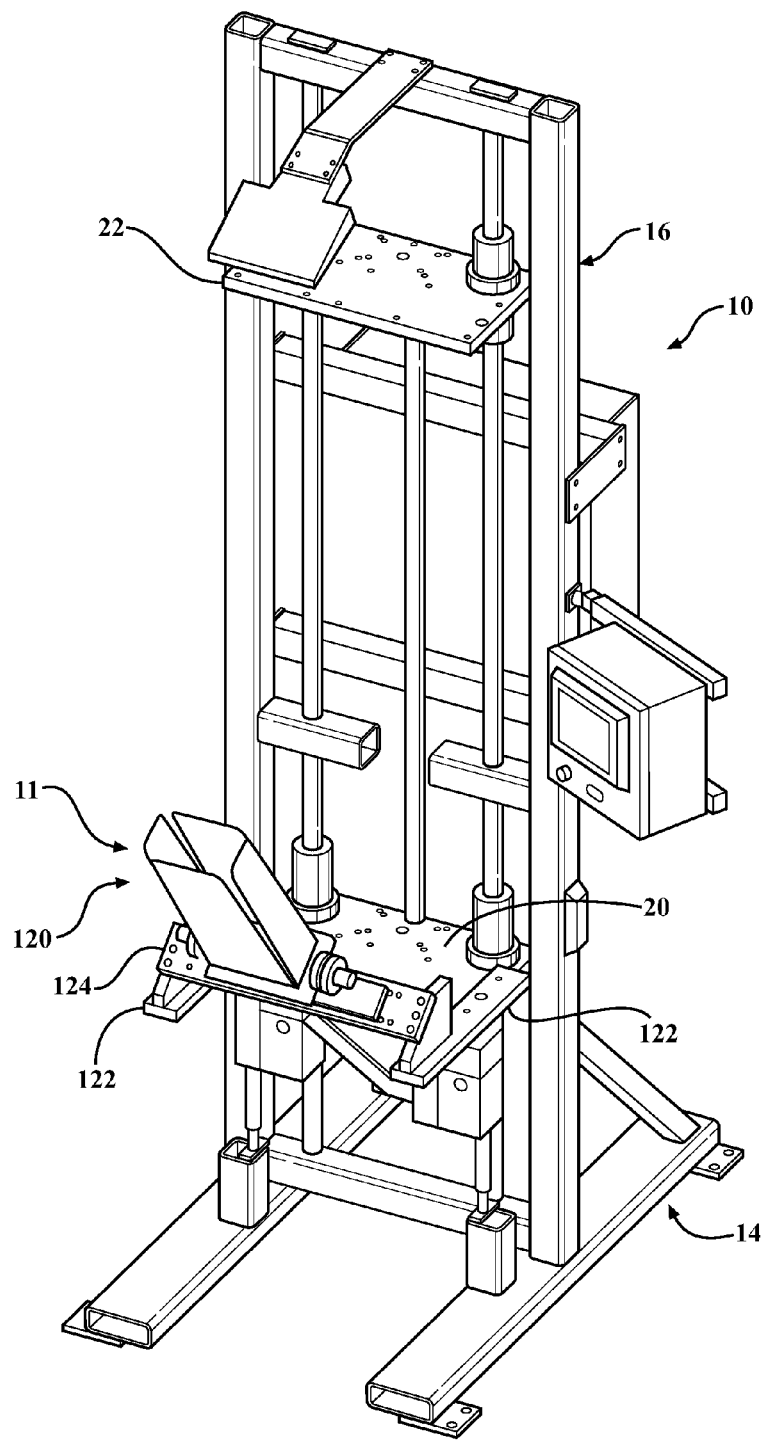
FIG. 12 is perspective view of the modular assembly table of the present invention being used in combination with an automobile arm rest chute stuffer.
Figure 13:
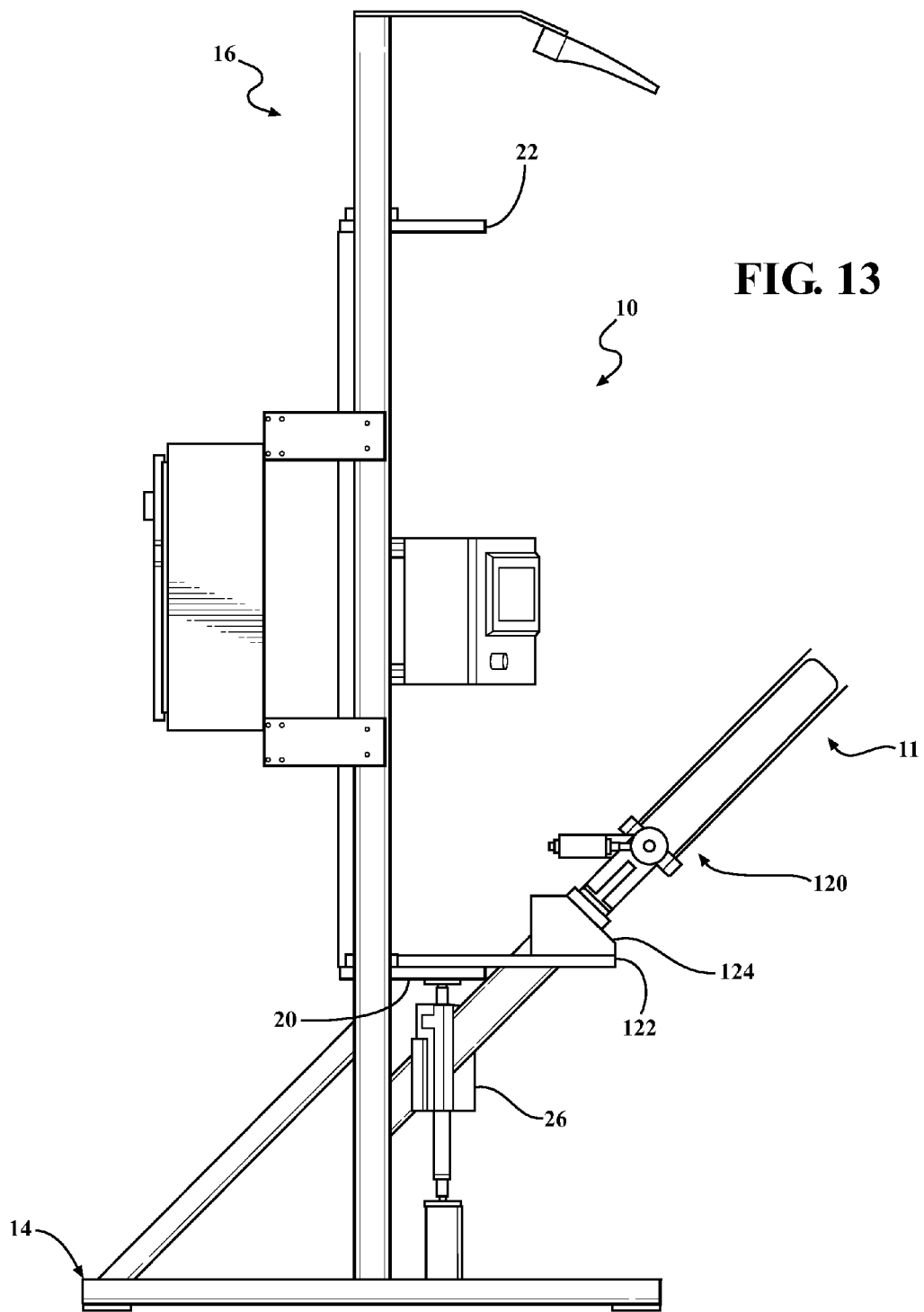
FIG. 13 is a side view of the modular assembly table of the present invention being used in combination with an automobile arm rest chute stuffer.

As seen in FIGS. 12-13, the modular assembly table 10 of the first embodiment may be utilized in combination with an automobile arm rest chute stuffer 120. The arm rest chute stuffer 120 has a pair of mounting rails 122 that are connected to the fixture plate 20 through the use of conventional fasteners. The mounting rails 122 have a fixture 124 connected thereto for securing the arm rest chute stuffer 120. The arm rest chute stuffer 120 assembles an arm rest (not shown) of an automobile.

Figure 14:
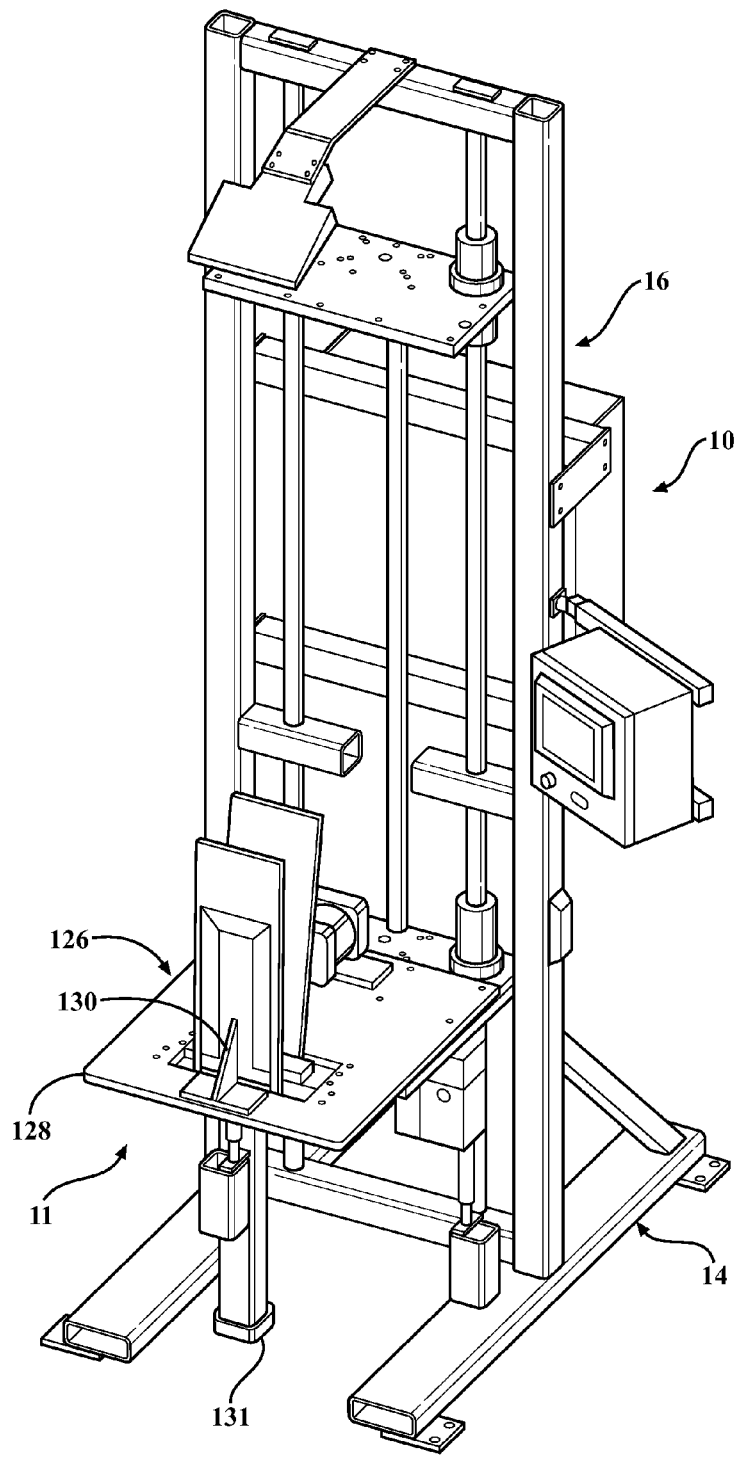
FIG. 14 is perspective view of the modular assembly table of the present invention being used in combination with an automobile arm rest compression stuffer.
Figure 15:
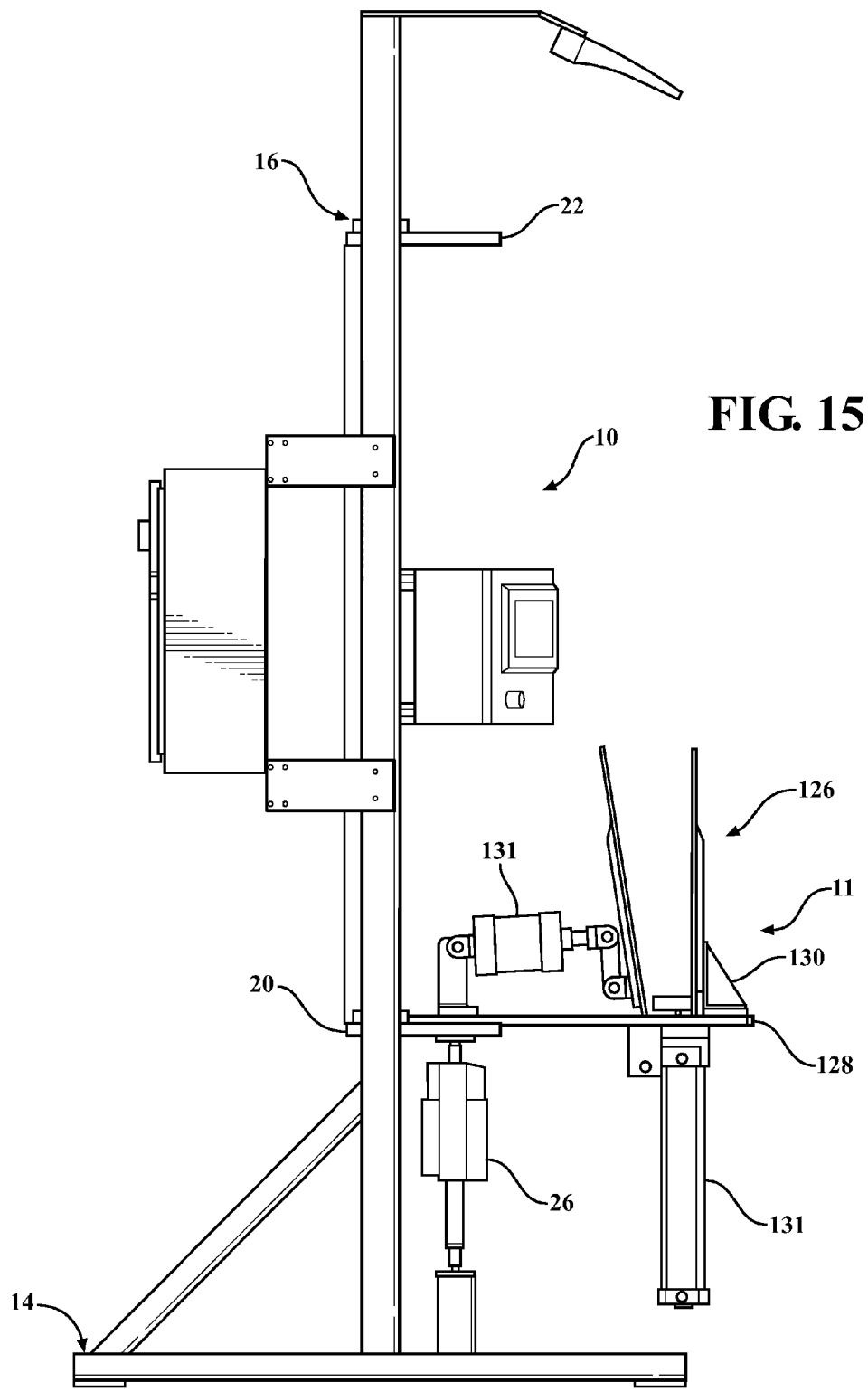
FIG. 15 is a side view of the modular assembly table of the present invention being used in combination with an automobile arm rest compression stuffer.

As seen in FIGS. 14-15, the modular assembly table 10 of the first embodiment may be used in combination with an automobile arm rest compression stuffer 126. The arm rest compression stuffer 126 has a mounting plate 128 that is connected directly to the fixture plate 20 through the use of conventional fasteners. The mounting plate 128 has a fixture 130 for mounting the arm rest compression stuffer 126 thereto while having a pair of pneumatic cylinders 131 for actuating the arm rest compression stuffer 126. The arm rest compression stuffer 126 is utilized to assemble an arm rest (not shown) of an automobile.

Figure 16:
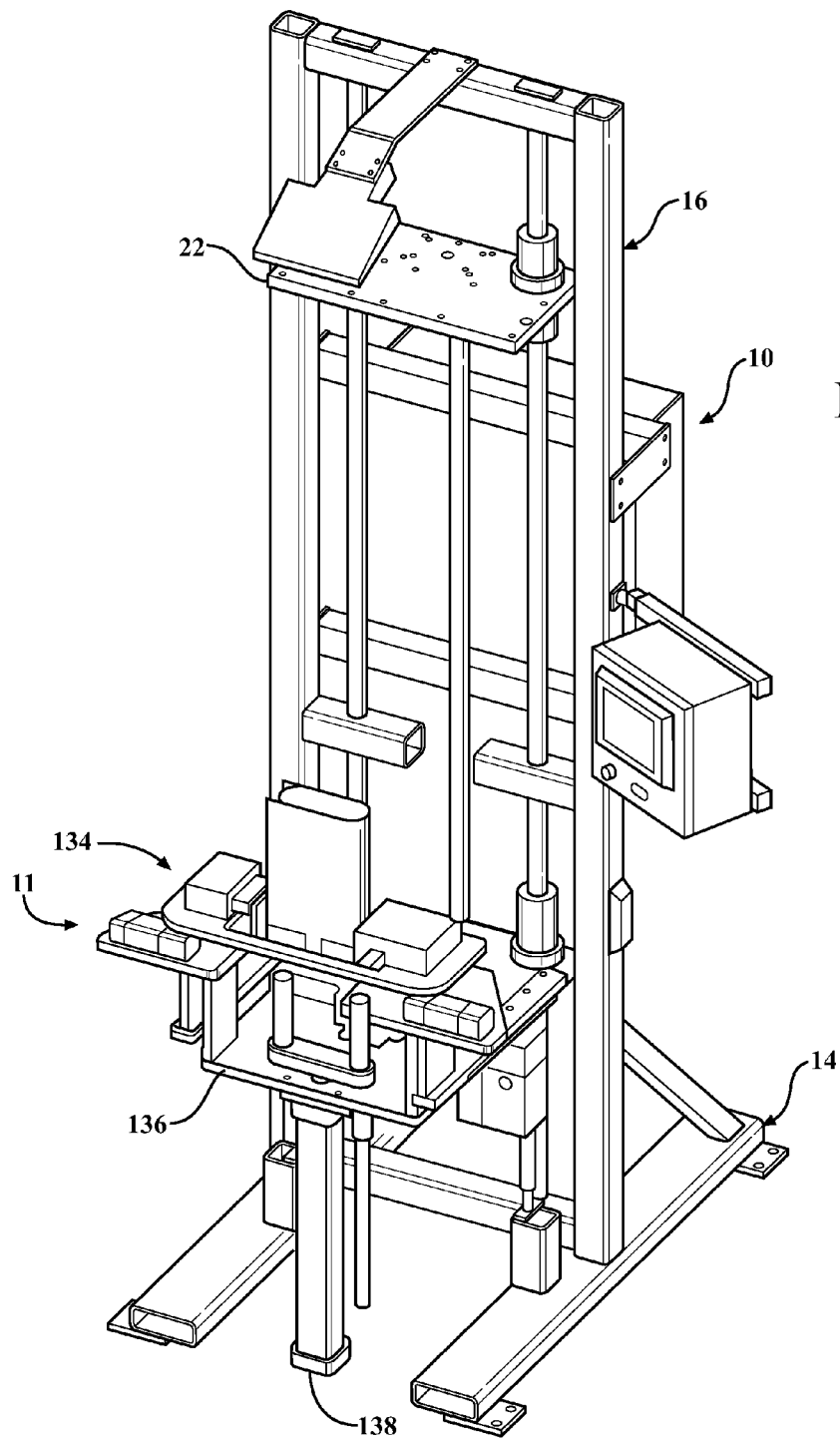
FIG. 16 is a perspective view of the modular assembly table of the present invention being used in combination with an automobile head rest chute stuffer.
Figure 17:
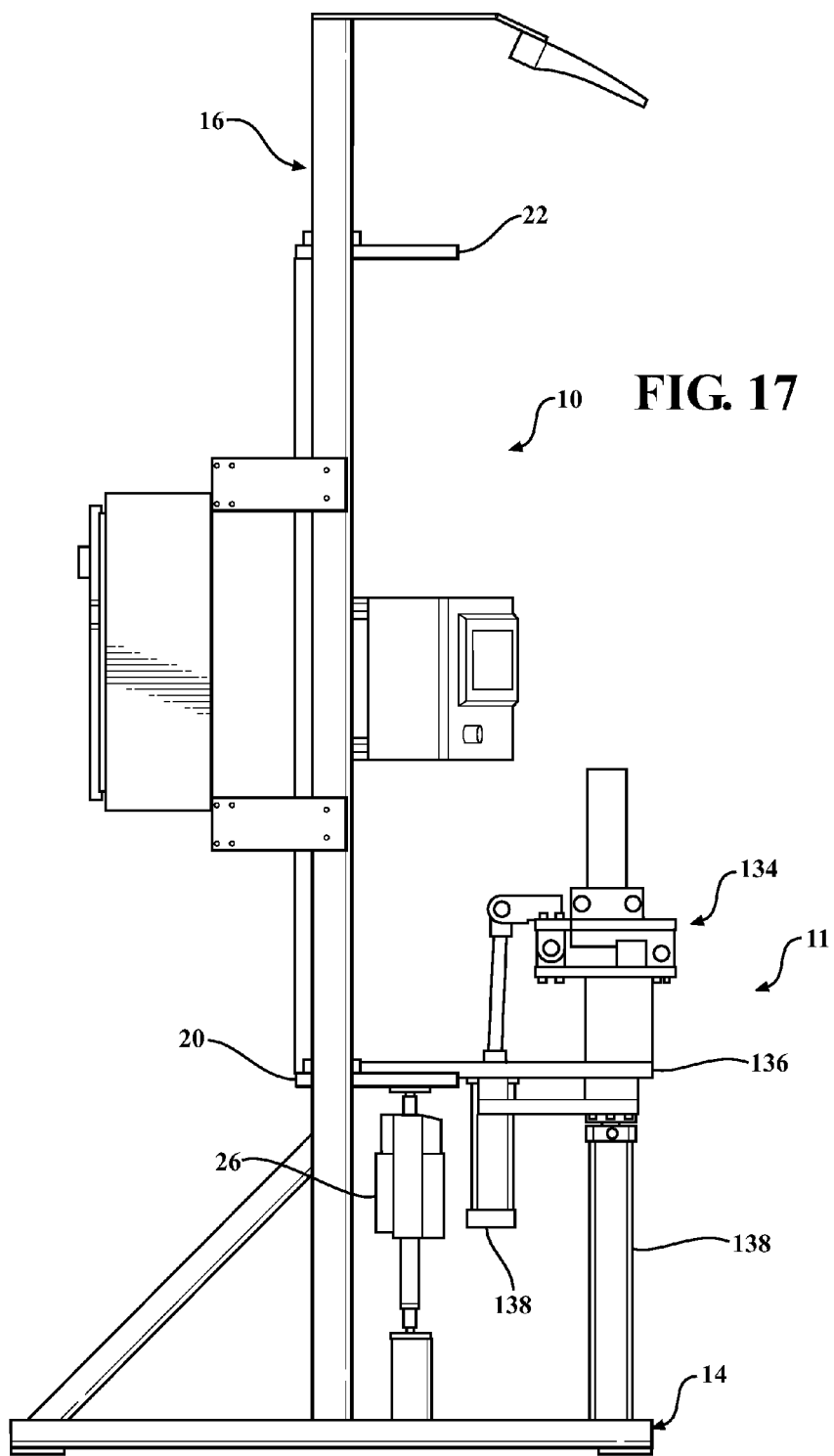
FIG. 17 is a side view of the modular assembly table of the present invention being used in combination with an automobile head rest chute stuffer.

As seen in FIGS. 16-17, the modular assembly table 10 of the first embodiment may be used in combination with an automobile head rest chute stuffer 134. The head rest chute stuffer 134 has a mounting plate 136 that is mounted to the fixture plate 20 through the use of conventional fasteners. A pair of hydraulic cylinders 138 are provided to actuate the head rest chute stuffer 134. The head rest chute stuffer 134 is utilized to assemble head rests (not shown) of automobiles.

Figure 18:
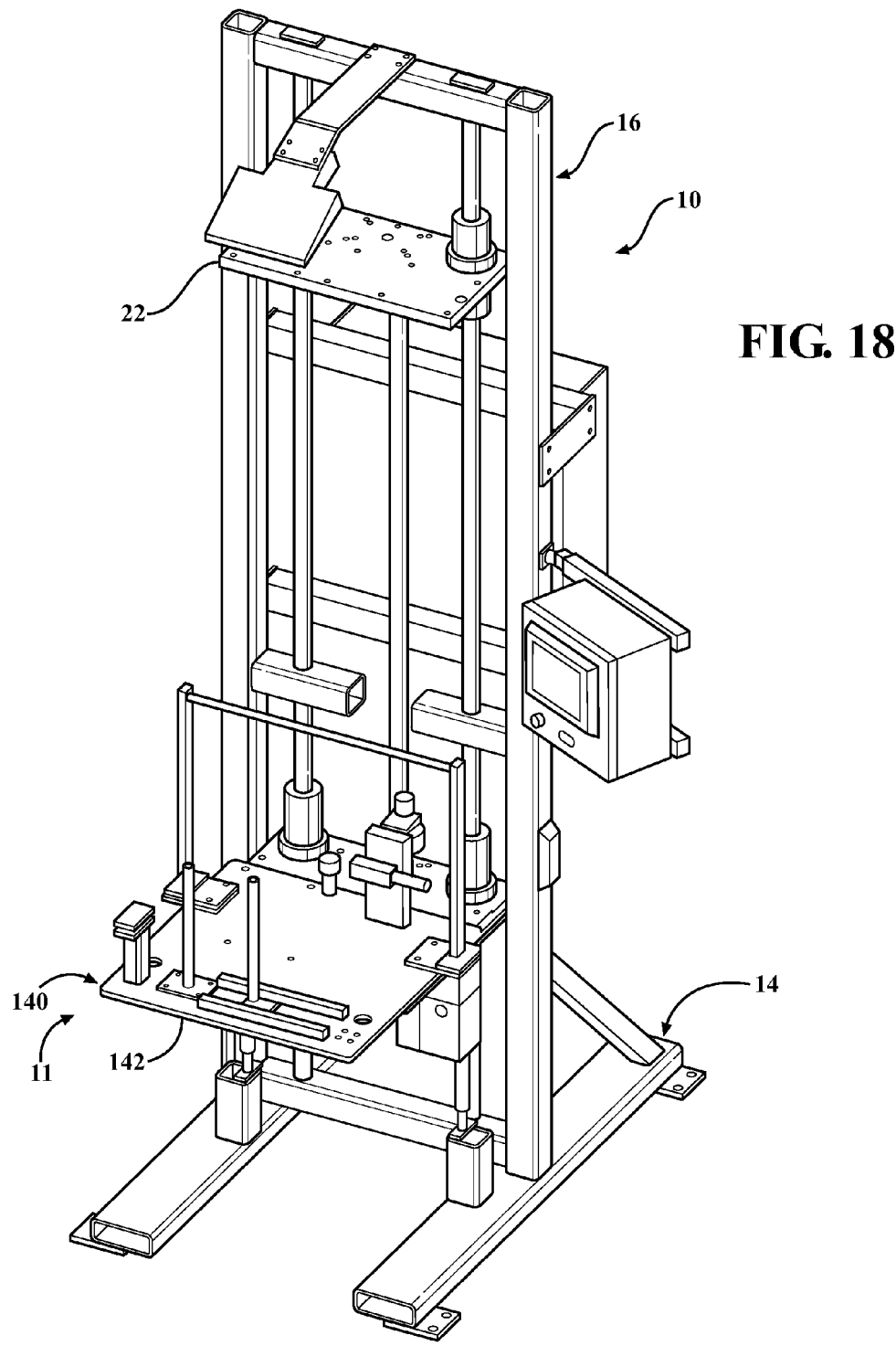
FIG. 18 is a perspective view of the modular assembly table of the present invention being used in combination with an automobile head rest vacuum fixture with bag holder.
Figure 19:
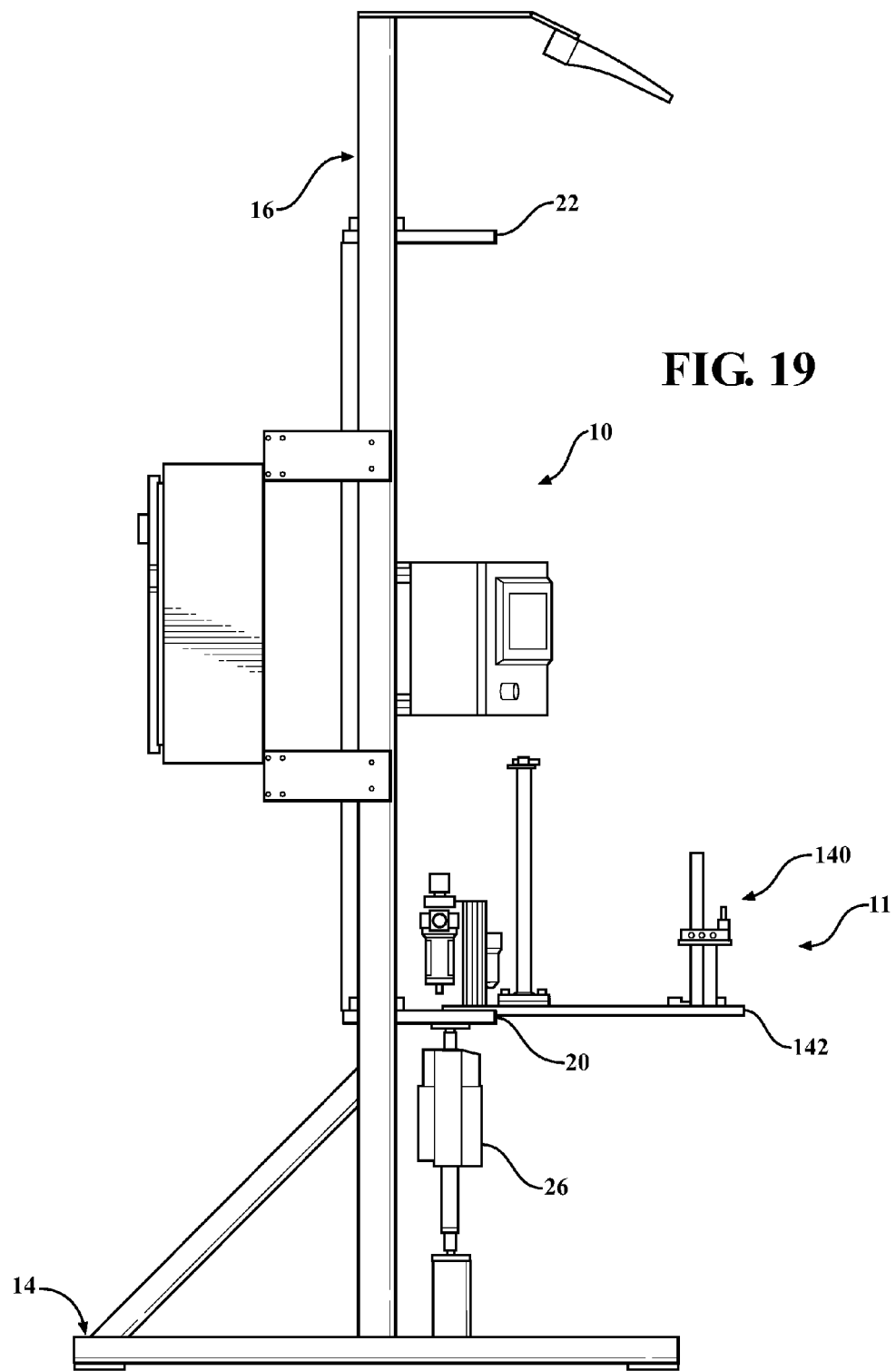
FIG. 19 is a side view of the modular assembly table of the present invention being used in combination with an automobile head rest vacuum fixture with bag holder.

As seen in FIGS. 18-19, the modular assembly table 10 of the first embodiment may be used in combination with an automobile head rest vacuum fixture with bag holder 140. The head rest vacuum with bag holder 140 provides a mounting plate 142 that is connected to the fixture plate 20 through the use of conventional fasteners. The head rest vacuum fixture with bag holder 140 is utilized to assemble the head rest (not shown) of an automobile.

Figure 20:
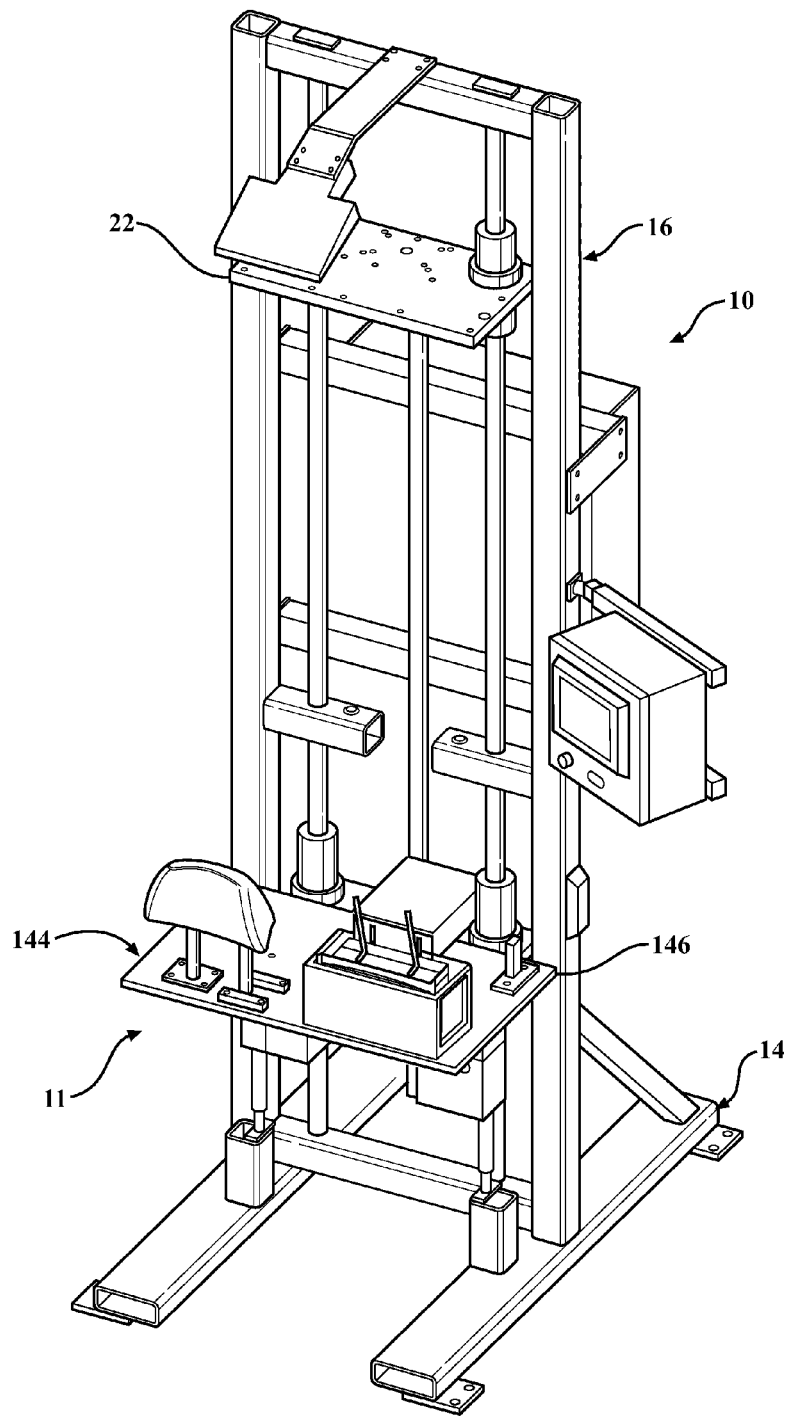
FIG. 20 is a perspective view of the modular assembly table of the present invention being used in combination with an automobile head rest vacuum with closing nest.
Figure 21:
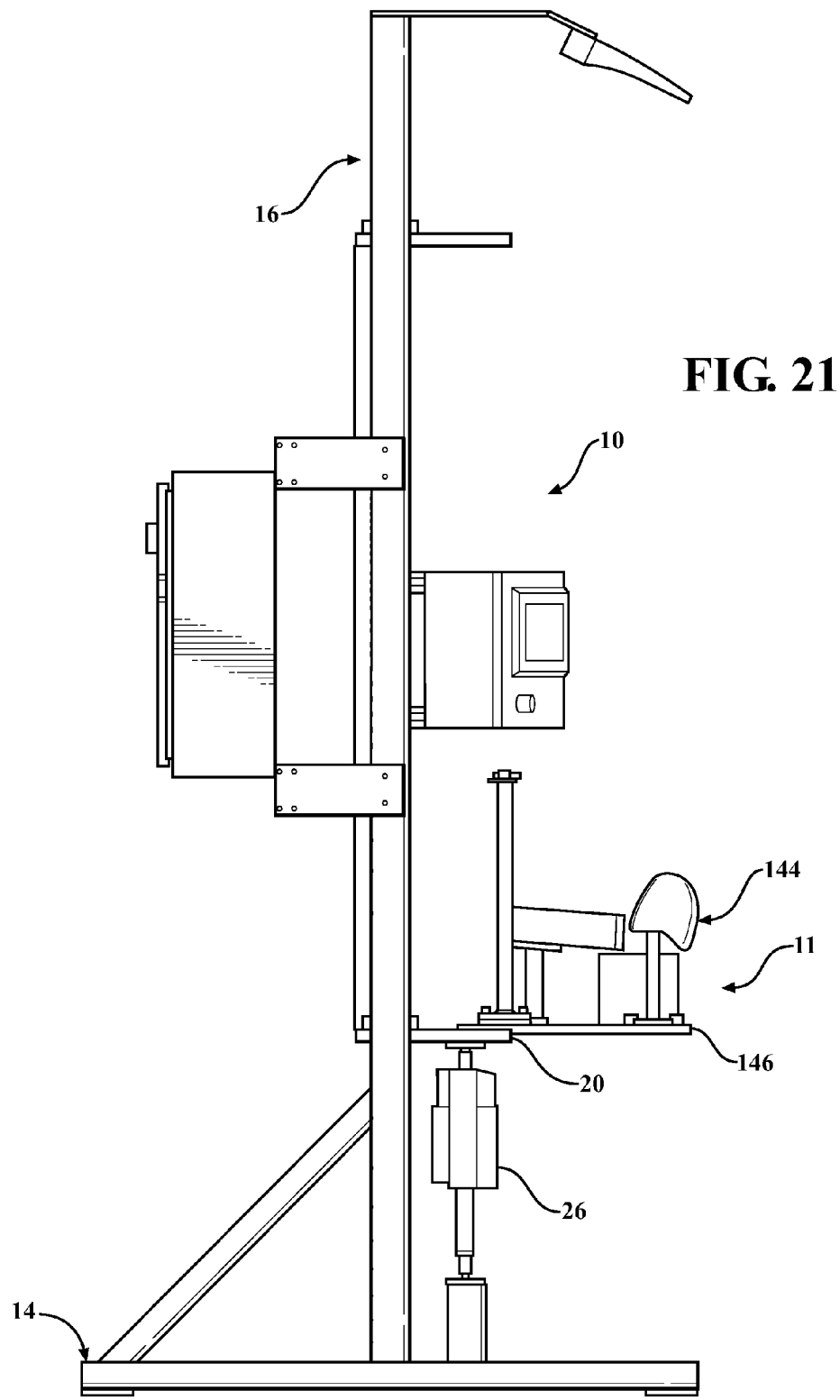
FIG. 21 is a side view of the modular assembly table of the present invention being used in combination with an automobile head rest vacuum with closing nest.

As seen in FIGS. 20-21, a modular assembly table 10 of the first embodiment may be utilized in combination with a head rest vacuum with closing nest 144. The head rest vacuum with closing nest 144 provides a mounting plate 146 that can be attached to the fixture plate 20 through the use of conventional fasteners. The head rest vacuum with closing nest 144 is utilized to assemble the head rest (not shown) of an automobile.

In operation, the modular assembly table 10 may be utilized in various ways, depending on the nature of the required industrial fixtures 11 and tooling 13, as well as the workpiece 15. As seen in the disclosed embodiments, the modular assembly table 10 has the flexibility to support numerous industrial fixtures 11 and industrial tooling 13. Various industrial fixtures 11 and industrial tooling 13 can be connected to and supported by the modular assembly table 10 in a relatively quick and efficient manner, and thus, the modular assembly table 10 of the present invention provides unique and distinct advantages over the prior art.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A modular assembly table for supporting industrial fixtures and tooling for manufacturing and assembling various workpieces, comprising:
   a support structure having a base and an upright framing structure connected to said base;
   at least one guide rod connected to and supported by said support structure;
   a fixture plate slidably connected to said at least one guide rod;
   an extension plate slidably connected to said at least one guide rod and spaced from said fixture plate; and
   a rigid connector attached to said fixture plate and said extension plate for maintaining a fixed predetermined distance between said fixture plate and said extension plate.

2. The modular assembly table as stated in claim 1, further comprising:
   at least one linear actuator connected to said support structure and said fixture plate for linearly adjusting the position of said fixture plate along said at least one guide rod.

3. The modular assembly table as stated in claim 2, further comprising:
   at least one controller connected to said upright framing structure for controlling said at least one linear actuator.

4. The modular assembly table as stated in claim 1, further comprising:
   at least one bushing connected to said fixture plate and slidably connected to said at least one guide rod for providing linear adjustment of said fixture plate along said at least one guide rod; and
   at least one bushing connected to said extension plate and slidably connected to said at least one guide rod for providing linear adjustment of said extension plate along said at least one guide rod.

5. The modular assembly table as stated in claim 1, said base further comprising:
   at least one substantially rectangular hollow, rigid member.

6. The modular assembly table as stated in claim 1, said upright framing structure further comprising:
   a pair of substantially parallel elongate support members connected to said base;
   a pair of substantially parallel crossbar members connected to and extending between said support members; and
   a pair of substantially parallel diagonal support members connected to and extending between said support members and said base.

7. The modular assembly table as stated in claim 1, further comprising:
   at least one cantilevered support connected to and extending from said upright framing structure and having an aperture extending therethrough for receiving said at least one guide rod.

8. The modular assembly table as stated in claim 1, wherein said connector further comprises:
   a linear actuator having a cylinder and a piston rod extending from said cylinder, wherein said cylinder is connected to said fixture plate, and said piston rod is connected to said extension plate, and said piston rod is linearly adjustable to adjust the distance between said fixture plate and said extension plate.

9. The modular assembly table as stated in claim 1, further comprising:
   a slide rod connected to said extension plate, and said slide rod slidably connectable to said tooling.

10. A modular assembly for supporting industrial fixtures and tooling for manufacturing and assembling various workpieces, comprising:
    a support structure having a base and an upright framing structure connected to said base;
    a pair of substantially parallel guide rods connected to and supported by said support structure;
    a fixture plate having a pair of apertures extending therethrough for slidably receiving said pair of guide rods;
    an extension plate having a pair of apertures extending therethrough for slidably receiving said pair of guide rods, wherein said extension plate is substantially parallel to and spaced from said fixture plate;
    a rigid connector attached to said fixture plate and said extension plate for maintaining a fixed predetermined distance between said fixture plate and said extension plate; and
    at least one linear actuator connected to said support structure and said fixture plate for linearly adjusting the position of said fixture plate along said pair of guide rods.

11. The modular assembly table as stated in claim 10, further comprising:
    at least one electrical controller connected to said upright framing structure for controlling said at least one linear actuator.

12. The modular assembly table as stated in claim 10, further comprising:
    a pair of bushings connected to said fixture plate and slidably connected to said pair of guide rods for providing linear adjustment of said fixture plate along said pair of guide rods; and
    a pair of bushings connected to said extension plate and slidably connected to said pair of guide rods for providing linear adjustment of said extension plate along said pair of guide rods.

13. The modular assembly table as stated in claim 10, wherein said base further comprises:
   a pair of substantially parallel rigid, hollow members having a mounting bracket connected thereto, which is connectable to a substructure.

14. The modular assembly table as stated in claim 10, wherein said upright framing structure further comprises:
   a pair of substantially parallel, elongate support members connected to said base;
   a pair of substantially parallel cross-members connected to and extending between said support members; and
   a pair of substantially parallel diagonal support members connected to and extending between said support members and said base.

15. The modular assembly table as stated in claim 10, further comprising:
   a pair of cantilevered supports connected to and extending from said upright framing structure, and each of said cantilevered supports having an aperture extending therethrough for receiving said pair of guide rods.

16. The modular assembly table as stated in claim 10, further comprising:
   a linear actuator having a cylinder and a piston rod extending from said cylinder, wherein said cylinder is connected to said fixture plate, and said piston rod is connected to said extension plate, wherein said piston rod is linearly adjustable to adjust the distance between said fixture plate and said extension plate.

17. The modular assembly table as stated in claim 10, further comprising:
   a slide rod connected to said extension plate, and said slide rod slidably connectable to said tooling.

18. A modular assembly table for supporting industrial fixtures and tooling for manufacturing and assembling various workpieces, comprising:
   a base having a pair of substantially parallel rigid, rectangular hollow members;
   a pair of substantially parallel elongate support members connected to and extending from said base;
   a pair of substantially parallel crossbar members connected to and extending between said support members;
   a pair of substantially parallel diagonal support members connected to and extending between said support members and said base;
   a pair of substantially parallel guide rods connected to and supported by said crossbar members;
   a fixture plate having a pair of apertures extending therethrough for slidably receiving said pair of guide rods;
   an extension plate having a pair of apertures extending therethrough for slidably receiving said pair of guide rods, wherein said extension plate is substantially parallel to and spaced from said fixture plate;
   a rigid connector attached to said fixture plate and said extension plate for maintaining a predetermined distance between said fixture plate and said extension plate; and
   at least one linear actuator connected to one of said pair of crossbar members and said fixture plate for linearly adjusting the position of said fixture plate along said pair of guide rods.

19. The modular assembly table as stated in claim 18, further comprising:
   a pair of bushings connected to said fixture plate and slidably connected to said pair of rods for providing linear adjustment of said fixture plate along said pair of guide rods; and
   a pair of bushings connected to said extension plate and slidably connected to said pair of guide rods for providing linear adjustment of said extension plate along said pair of guide rods.

20. The modular assembly table as stated in claim 18, wherein said connector further comprises:
   a linear actuator having a cylinder and a piston rod extending from said cylinder, wherein said cylinder is connected to said fixture plate, and said piston rod is connected to said extension plate, wherein said piston rod is linearly adjustable to adjust the distance between said fixture plate and said extension plate.

* * * * *